(12) United States Patent
Ikeda

(10) Patent No.: US 6,626,215 B2
(45) Date of Patent: Sep. 30, 2003

(54) PNEUMATIC TIRE INCLUDING LONG AND NARROW BLOCKS WITH AT LEAST TWO SIPES

(75) Inventor: Akio Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/767,958

(22) Filed: Jan. 24, 2001

(65) Prior Publication Data

US 2002/0011291 A1 Jan. 31, 2002

(30) Foreign Application Priority Data

Dec. 4, 2000 (JP) .......................................... 2000-14702

(51) Int. Cl.⁷ .......................... B60C 11/03; B60C 11/12; B60C 101/00; B60C 103/04
(52) U.S. Cl. ............................ 152/209.18; 152/209.28; 152/903; 152/DIG. 3
(58) Field of Search ...................... 152/209.18, DIG. 3, 152/209.28, 903

(56) References Cited

U.S. PATENT DOCUMENTS

| | | | |
|---|---|---|---|
| 2,926,715 A | * | 3/1960 | Constantakis |
| 4,632,166 A | | 12/1986 | Fontaine et al. |
| 5,198,047 A | * | 3/1993 | Graas et al. |
| 5,824,169 A | * | 10/1998 | Landers et al. |
| 5,837,074 A | * | 11/1998 | Uemura |
| 6,340,040 B1 | * | 1/2002 | Ikeda |

FOREIGN PATENT DOCUMENTS

| | | | |
|---|---|---|---|
| EP | 6886851 | * | 12/1995 |
| EP | 0 782 936 A | | 7/1997 |
| JP | 2-41908 | * | 2/1990 |
| JP | 2-241804 | * | 9/1990 |
| JP | 3-10908 | * | 1/1991 |
| JP | 9-2027 | * | 1/1997 |
| JP | 10-264617 | * | 10/1998 |

OTHER PUBLICATIONS

Patent Abstracts of Japan, vol. 1996, No. Oct, 31, 1996 (abstract of JP 08–142608).
Patent Abstracts of Japan, vol. Vol. 1999, No. Jan. 29, 1999 (abstract of JP 10–264617).

* cited by examiner

Primary Examiner—Steven D. Maki
(74) Attorney, Agent, or Firm—Birch, Stewart, Kolasch & Birch, LLP

(57) ABSTRACT

A pneumatic tire comprising a tread portion provided with oblique grooves to define narrow and circumferentially long blocks therebetween, the oblique grooves inclined at angles θ of not more than 60 degrees with respect to the circumferential direction of the tire, each of the long and narrow blocks provided with at least tow sipes each extending across the block from one of the adjacent oblique grooves to the other, while inclining reversely to the oblique grooves, to subdivide the block into at least three block pieces.

13 Claims, 4 Drawing Sheets

PNEUMATIC TIRE INCLUDING LONG AND NARROW BLOCKS WITH AT LEAST TWO SIPES

The present invention relates to a pneumatic tire, more particularly to a tread pattern capable of improving uneven wear resistance and ride comfort in a well-balanced manner.

In recent years, tread patterns comprising oblique grooves inclined at relatively small angles with respect to the circumferential direction became popular as suitable for radial tires for passenger cars, sport cars and the like.

In such a tread pattern, blocks formed between the oblique grooves are liable to become narrow and circumferentially long. As a result, uneven wear is liable to occur, and ride comfort is liable to become worse.

It is therefore, an object of the present invention to provide a pneumatic tire in which uneven wear resistance and ride comfort are improved although narrow and circumferentially long blocks are provided in the tread portion.

According to the present invention, a pneumatic tire comprises a tread portion provided with oblique grooves to define long and narrow blocks therebetween, the oblique grooves inclined at angles θ of not more than 60 degrees with respect to the circumferential direction of the tire, and each of the blocks provided with sipes extending thereacross from one of the adjacent oblique grooves to the other, while inclining reversely to the oblique grooves, to subdivide the block into at least three block pieces.

An embodiment of the present invention will now be described in detail in conjunction with the accompanying drawings.

Figure 1:
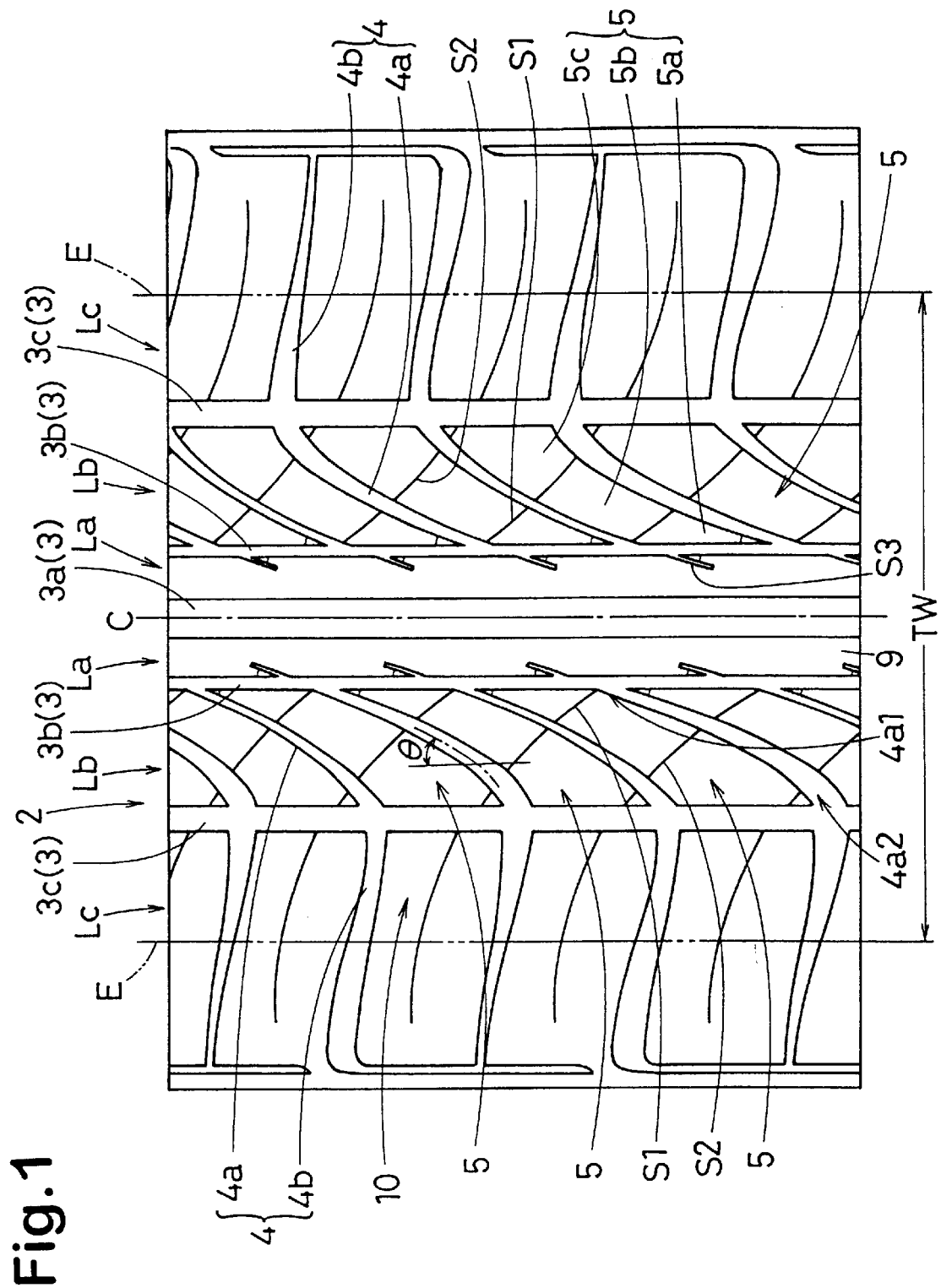
FIG. 1 is a developed plan view of a pneumatic tire according to the present invention showing an example of the tread pattern.

In the drawings, pneumatic tire 1 according to the present invention is provided in a tread portion 2 with circumferential grooves 3 extending continuously in the circumferential direction of the tire, and circumferentially spaced oblique grooves 4.

In this embodiment, the pneumatic tire 1 is a radial tire of size 215/70R15 for passenger cars.

The circumferential grooves 3 are substantially straight grooves, and include a central groove 3a disposed on the tire equator C, an axially outer groove 3c disposed on each side thereof, and a middle groove 3b disposed between the central groove 3a and outer groove 3c, whereby the tread portion 2 is axially divided into two central regions La between the middle circumferential grooves 3b and the central circumferential groove 3a, two middle regions Lb between the middle circumferential grooves 3b and outer circumferential grooves 3c, and two outer regions Lc between the outer circumferential grooves 3c and tread edges E.

In order to provide greater drainage in the vicinity of the tire equator C, the central circumferential groove 3a is formed as the widest circumferential groove.

The widths of the central circumferential grooves 3a and outer circumferential grooves 3c are set in a range of not less than 5 mm to provide a good drainage. But, the widths of the middle circumferential grooves 3b are set in a range of less than 5 mm to maintain tread rigidity.

The depths of the central circumferential groove 3a and outer circumferential grooves 3c are set in a range of not less than 3%, preferably not less than 4% of the tread width TW (in this example about 5%). If the groove depths are less than 3% of the ground contacting width TW, it is difficult to obtain the necessary drainage. The depth of the middle circumferential grooves 3b is set in a range of from 20 to 50% of the depth of the central circumferential grooves 3a to prevent the tread rigidity from decreasing.

Here, the tread width TW is the maximum axial width of the ground contacting area under a standard condition in which the tire is mounted on a standard rim and inflated to a standard load and then loaded with a standard load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 180 kPa is used as the standard pressure. The standard load is the "maximum load capacity" in JATMA, the "Load Capacity" in ETRTO, the maximum value given in the above-mentioned table in T&RA or the like.

The oblique grooves 4 each extend continuously from the vicinity of the tire equator C to one of tread edges E.

In this example, each of the oblique grooves 4 is made up of a first oblique groove 4a between the middle circumferential groove 3b and outer circumferential groove 3c, and a second oblique groove 4b between the outer circumferential groove 3c and tread edge E.

The first oblique groove 4a is inclined at an angle θ of not more than 60 degrees, preferably not more than 45 degrees with respect to the circumferential direction of the tire. The first oblique groove 4a may be formed as a substantially straight groove, but in this example, it has a curved configuration such that the angle θ gradually increases from the axially inner end 4a1 at the middle circumferential groove 3b to the axially outer end 4a2 at the outer circumferential groove 3c. And the angle θ min of the first oblique groove 4a at the axially inner end 4a1 is set to be more than 0 degrees but not more than 30 degrees, preferably in a range of from 15 to 30 degrees.

On the other hand, in order to increase the axial rigidity of the outer region Lc to improve the steering stability, the second oblique groove 4b is inclined at an angle θ of more than 60 degrees, preferably not less than 75 degrees, more preferably 80 to 90 degrees with respect to the circumferential direction of the tire. In this example, with respect to the axial direction, the second oblique groove 4b is slightly inclined reversely to the first oblique groove 4a.

The width of each oblique groove 4 is set in a range of not less than 2.5%, preferably not less than 3.0%, more preferably 3.0 to 3.5% of the tread width TW. In this example, the second oblique grooves 4b comprise grooves whose width gradually increases towards the tread edge E and grooves whose width gradually increases towards the tire equator, and these two types of grooves are alternately disposed in the tire circumferential direction. The first oblique grooves 4a comprises wide grooves and narrow grooves which are alternately disposed in the tire circumferential direction, and both the wide and narrow grooves 4a are increased in the width towards the outer circumferential grooves 3c.

Figure 2:
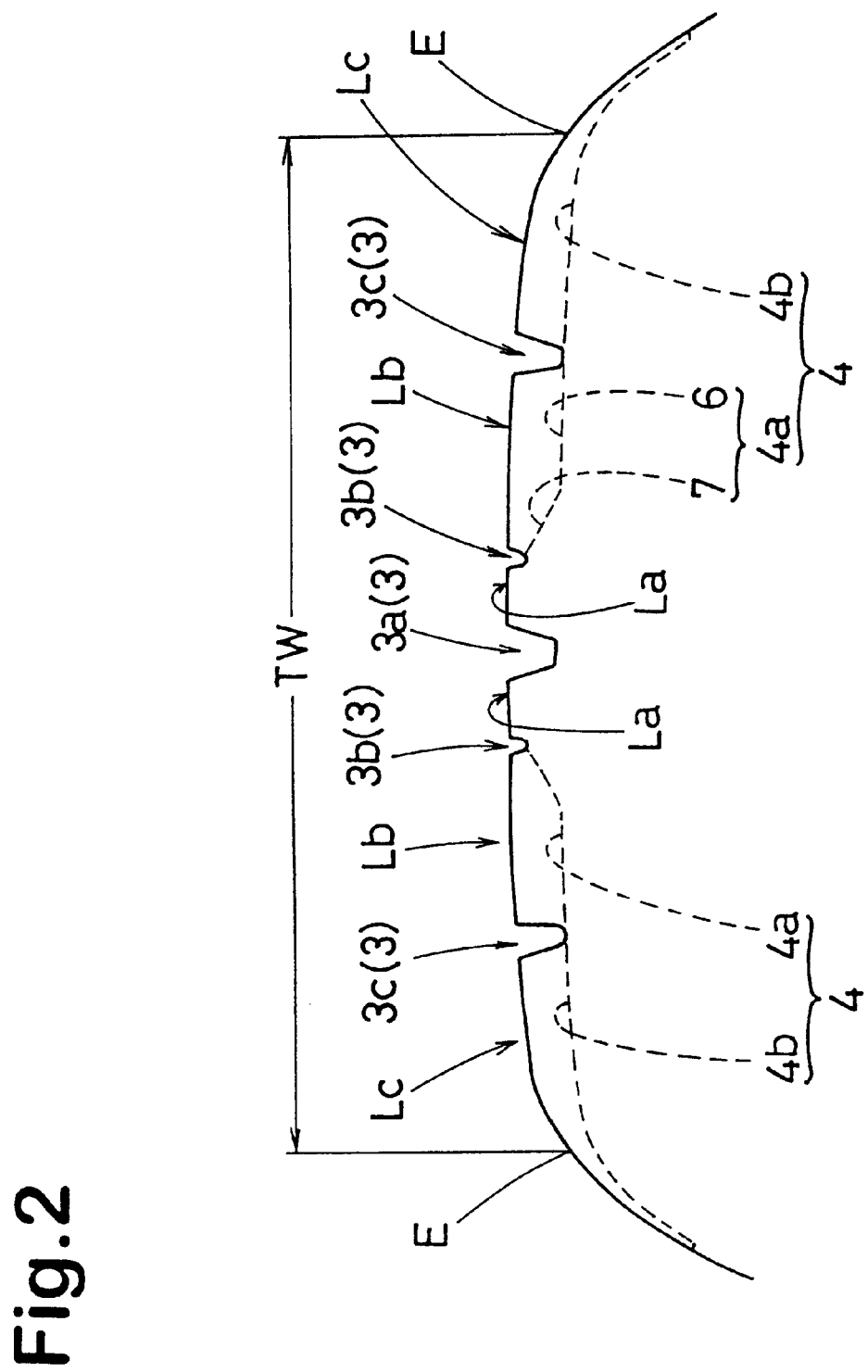
FIG. 2 is a schematic cross sectional view of the tread portion.
Figure 3:
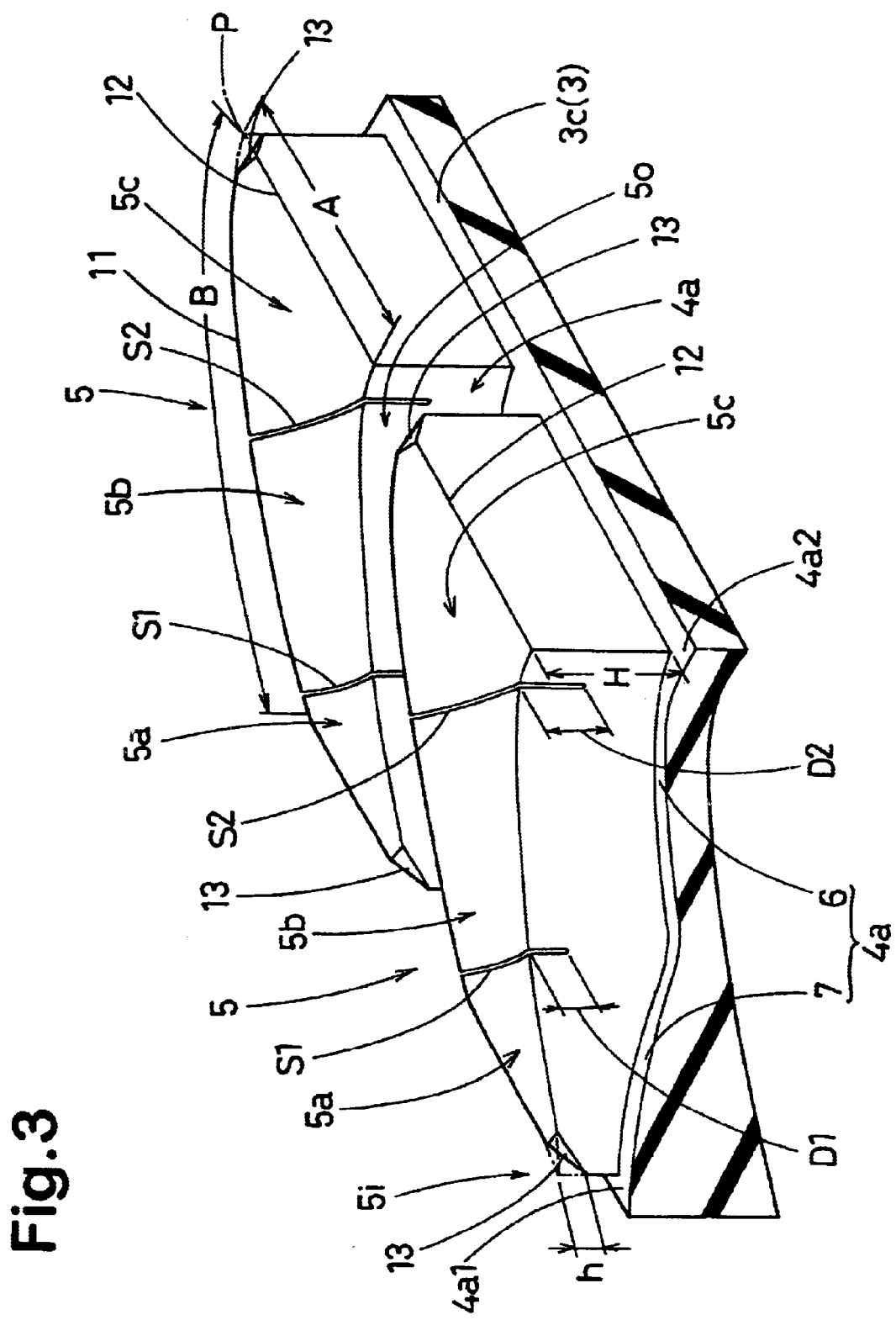
FIG. 3 is a perspective view showing blocks thereof.

As to the depth of the oblique groove 4, as shown in FIG. 2 and FIG. 3, the first oblique groove 4a in this example has a deep part 6 having substantially the same depth as the central circumferential groove 3a, and a shallow part 7 having a depth less than the central circumferential groove 3a. The shallow part 7 extends from the inner end 4a1 of the first oblique groove 4a for a length of from 15 to 50%, preferably 30 to 50% of the length of the first oblique groove 4a. The deep part 6 is defined as the remainder on the axially outside thereof. In the shallow part 7, the depth gradually increases from the inner end 4a1 to the deep part 6.

The above-mentioned central regions La each form a circumferentially continuous rib 9. The middle regions Lb each form a circumferential row of long and narrow blocks 5 of a substantially parallelogram. And the outside regions Lc each forms a circumferential row of blocks 10 of a substantially rectangle.

The long and narrow blocks 5 are formed such that the ratio (B/A) of the length B of the block's oblique edge 11 along each of the adjacent oblique grooves 4 to the length A of the block's circumferential edge 12 along the middle circumferential groove 3b is set in a angle of not less than 1.5, preferably not less than 2.0.

A block having such a long oblique edge 11 has a tendency to deteriorate the resistance to uneven wear and envelope effect or ride comfort. In the present invention, therefore, each block 5 is provided with at least two sipes S each extending thereacross from one of the adjacent first oblique grooves 4a to the other, while inclining reversibly to the first oblique grooves 4a. The sipes S are defined as a cut or very narrow groove having a widths of from 0.6 to 2.0 mm, preferably 0.6 to 1.5 mm, more preferably 0.6 to 1.0 mm.

It is preferable that the sipes S are inclined at an angle of not more than 60 degrees, more preferably 30 to 45 degrees with respect to the circumferential direction of the tire.
As a result, the block 5 is subdivided into at least three block piece: an axially innermost block piece 5a, an axially outermost block piece 5c, and at least one middle block piece 5b therebetween.

As to the depth of the sipes, it is preferable to gradually increase the depth from the axially innermost sipe to the axially outermost sipe, that is, the axially inner sipe is shallower than the axially outer sipe. In this example, two sipes S1 and S2 are provided, and the depth D1 of the axially inner sipe S1 is less than the depth D2 of the axially outer sipe S2. The depth D1 of the axially innermost sipe S1 is set in a range of from 10 to 30%, more preferably 20 to 25% of the depth of the deep part 6 of the first oblique groove 4a. The depth D2 of the axially outermost sipe S2 is set in a range of from 20 to 40%, preferably 30 to 40% of the depth of the deep part 6.

Further, the sizes of the block pieces 5a, 5b and 5c are gradually increased from the axially inside to the outside such that the areas As1, As2 and As3 of the top surfaces of the block pieces 5a, 5b and 5c, respectively, are gradually increased axially outwards, namely, As1<As2<As3.

It is preferable that the area As1 of the axially innermost block piece 5a is in a range of from 25 to 80%, more preferably 30 to 50% of the widest area As3 of the axially outermost block piece 5c.

The diameter of the tire is maximum at the tire equator C and decreases towards the tread edges E. The rate of change or decrease is relatively small in the vicinity of the tire equator C. Therefore, the slippage on the road surface during running is smaller in the inner block piece 5a than the outer block piece 5c. Accordingly, even when the area As1 of the inner block piece 5a is decreased, uneven wear does not concentrate on the inner block piece 5a. Especially, as the first oblique groove 4a is provided with the shallow part 7, even when the area As1 is decreased relatively, an excessive decrease in the rigidity can be avoided, and the resultant deterioration in the steering stability is effectively prevented.

In this example, as shown in FIG. 1, the sipe S1 on a block 5 and the sipe S2 on a next block 5 and further a sipe provided on one of the axially outer blocks 10 are aligned along a slightly curved line which extends axially outwards from the middle circumferential groove beyond the tread edge E across the first oblique grooves 4a and outer circumferential groove 3c.

Further, as shown in FIG. 3, the circumferential ends 5i, 5o of each block 5 formed in the corners between the circumferential grooves 3b, 3c and first oblique grooves 4a, are chamfered by a substantially triangular slope 13 to remove pointed ends P. Preferably, the slope 13 extends from the ground contacting top face of the block 5 to a depth (h) of from 10 to 30%, preferably 10 to 20% of the maximum height H of the block 5. Therefore, uneven wear and tearing-off of the block can be prevented, and the impact noise can be further reduced.

The above-mentioned ribs 9 can be provided with sipes S3 or cuts to adjust the rigidity.

In the example shown in FIG. 1, the arrangement and inclinations of the oblique grooves and sipes are reversed between one side of the tire equator and the other side. Generally speaking, the tread pattern is rotational symmetry. Therefore, the tread pattern is bi-directional. In this invention, however, it is also possible to provide a uni-directional tread pattern. For example, by making the arrangement and inclinations of the oblique grooves and sipes on one side of the tire equator the same as those on the other side, a uni-directional tread pattern can be formed. In any case, if necessary, a variable pitching method can be adopted in arranging the oblique grooves and sipes. Further, a phase shift can be provided between one side of the tire equator and the other side.

In case of passenger car tires, it is preferable that the block 5 is subdivided into three pieces as explained above. But, the block 5 may be divided into more than three, for example four or five block pieces.

Comparison Tests

Radial tires of size 215/70R15 for passenger cars were prepared and tested for wet performance, noise performance, ride comfort, wear resistance, and steering stability.

All the test tires had the same structure except for the tread patterns, wherein the carcass was composed of a single ply of polyester cords arranged radially at 88 degrees with respect to the tire equator, and the tread reinforcing belt was composed of two cross plies of steel cords.

Figure 4:
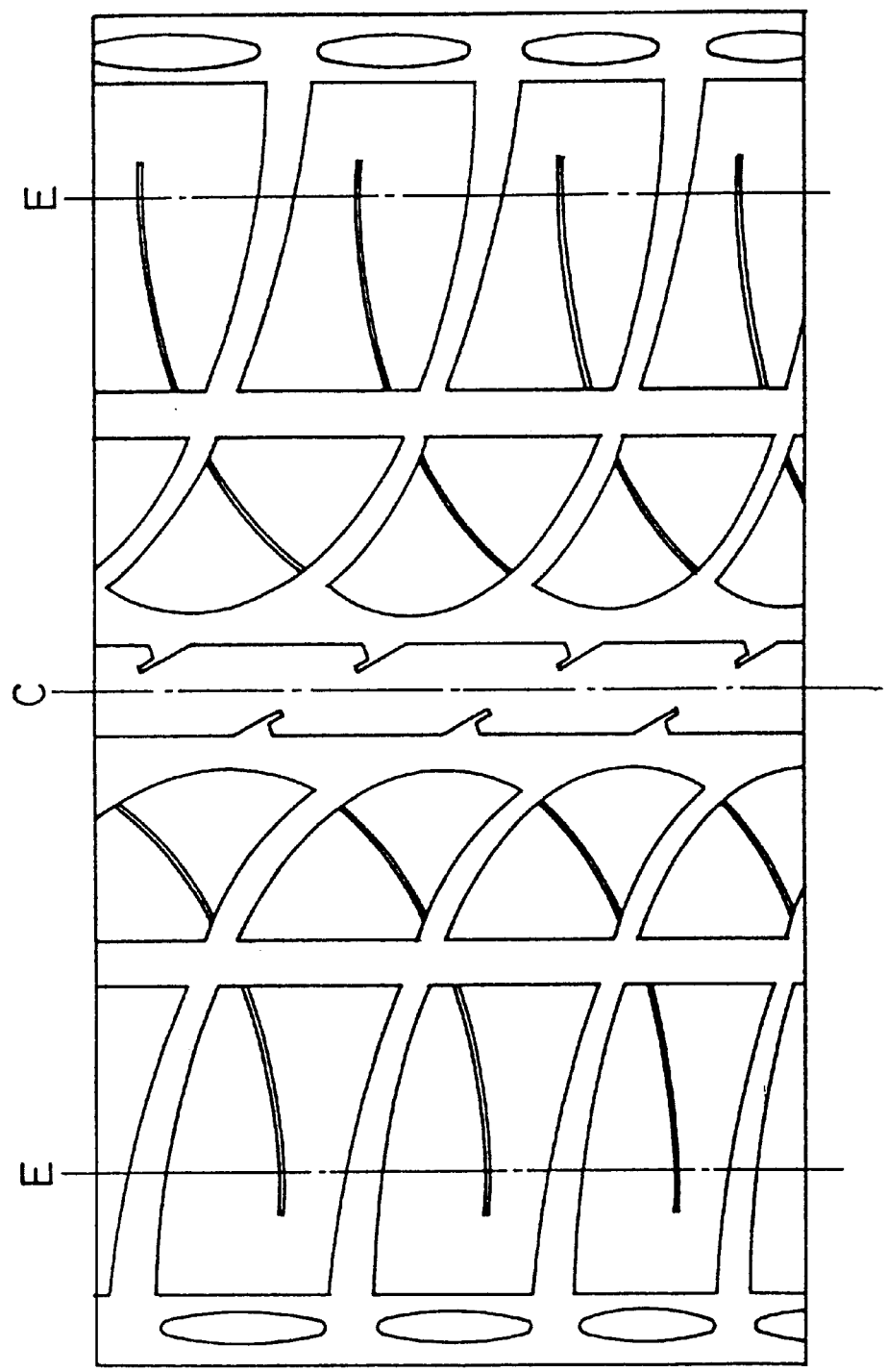
FIG. 4 shows a tread pattern of a reference tire used in comparison tests.

Example tires 1–8 had the tread pattern shown in FIG. 1, wherein the ratio B/A was set in a range of about 1.8 to 2.2. Reference tire 1 had a tread pattern shown in FIG. 4. Reference tire 2 had a tread pattern shown in FIG. 1 but from which the sipes were removed.

Wet Performance Test

A test car (2000 cc Japanese passenger car) was run on a wet asphalt road provided with a 10 mm depth 20 m long water pool along a 100 meter radius circle, and the lateral acceleration (lateral-G) was measured to obtain the average lateral G, on the front wheels, in a speed range of from 50 to 80 km/h. The test results are shown in Table 1, wherein the results are indicated by an index based on Ref tire 1 being 100. The larger the index, the higher the resistance to aquaplane.

Wheel rim size: 6½×15
Inner pressure: 180 kPa

Noise Test

During running the test car on a smooth asphalt road at a speed of 60 km/h, the test driver evaluated the pattern noise. The results are indicated in Table 1 by an index based on Ref tire 1 being 100. The smaller the index, the better the pattern noise.

Ride Comfort Test

During running the test car on dry uneven roads (asphalt road, gravel road, stone paved road), the test driver evaluated harshness, thrust up and damping. The results are indicated in Table 1 by an index based on Ref tire 1 being 100. The larger the index, the better the ride comfort.

Wear Resistance Test

During running the test car on a test course at a speed of 100 km/hr, 0.45 G braking was made four times par 3 km. When the running distance reached to 500 km, a difference between the maximum wear at the circumferential ends of block 5 and the minimum wear in the circumferential central thereof was measured. In Table 1, the reciprocal of the difference is indicated by an index based on Ref tire 1 being 100. The larger the index, the better the wear resistance.

Steering Stability Test

During running the test car on a dry asphalt road of a test course, the test driver evaluated the steering response during cornering, cornering limit, and behavior at the cornering limits. The results are indicated in Table 1 by an index based on Ref tire 1 being 100. The larger the index, the better the steering stability.

oblique grooves extending between the inner and outer circumferential grooves to define narrow and circumferentially long blocks therebetween, said oblique grooves inclined at angles θ of not more than 60 degrees with respect to the circumferential direction of the tire, the angle θ of each of the oblique grooves gradually increasing from an axially inner to an axially outer end thereof, each of said long and narrow blocks being provided with at least two sipes each extending across the block from one of the oblique grooves to an adjacent one of the oblique grooves, while inclining reversely to the oblique grooves, to subdivide the block into at least three block pieces including an axially innermost block piece, and axially outermost block piece, and at least one middle block piece therebetween, and top surface areas of said at least three block pieces gradually increasing from the axially innermost block piece to the axially outermost block.

2. The pneumatic tire according to claim 1, wherein the minimum of the angle θ at the axially inner end is more than 0 degrees but not more than 30 degrees.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Central circum. groove | | | | | | | | | | |
| Width (mm) | 6.1 | 8.9 | 8.9 | 8.9 | 8.9 | 8.9 | 8.9 | 8.9 | 8.9 | 8.9 |
| Depth (mm | 8.4 | 8.4 | 8.4 | 8.4 | 8.4 | 8.4 | 8.4 | 8.4 | 8.4 | 8.4 |
| Middle circum. groove | | | | | | | | | | |
| Width (mm) | — | 3.0 | 3.0 | 3.0 | 3.0 | 3.0 | 3.0 | 3.0 | 3.0 | 3.0 |
| Depth (mm) | — | 3.5 | 3.5 | 3.5 | 3.5 | 3.5 | 3.5 | 3.5 | 3.5 | 3.5 |
| Outer circum. groove | | | | | | | | | | |
| Width (mm) | 8.0 | 6.0 | 6.0 | 6.0 | 6.0 | 6.0 | 6.0 | 6.0 | 6.0 | 6.0 |
| Depth (mm) | 8.4 | 8.4 | 8.4 | 8.4 | 8.4 | 8.4 | 8.4 | 8.4 | 8.4 | 8.4 |
| First oblique groove | | | | | | | | | | |
| Angle θ (deg.) *1 | 60–70 | 20–50 | 20–50 | 30–60 | 20–50 | 20–50 | 20–50 | 20–50 | 20–50 | 20–50 |
| Width (mm) | 3 | 2/4 | 2/4 | 2/4 | 2/4 | 2/4 | 2/4 | 2/4 | 2/4 | 2/4 |
| Depth (mm)) | 6.8 | 8.4 | 8.4 | 8.4 | 8.4 | 8.4 | 8.4 | 8.4 | 8.4 | 8.4 |
| Second oblique groove | | | | | | | | | | |
| Angle θ (deg.) | 80 | 80 | 80 | 80 | 80 | 80 | 80 | 80 | 80 | 60 |
| Average width (mm) | 3 | 4 | 4 | 4 | 4 | 4 | 4 | 4 | 4 | 4 |
| Depth (mm) | 6.8 | 8.4 | 8.4 | 8.4 | 8.4 | 8.4 | 8.4 | 8.4 | 8.4 | 8.4 |
| Block | | | | | | | | | | |
| Block piece area ratio (In:Mid:Out) | — | — | 1:2.5:3 | 1:2.5:3 | 1:2:2 | 1:1:1 | 1:0.5:0.5 | 1:2.5:3 | 1:2.5:3 | 1:2.5:3 |
| Cut-out part | — | — | provided | provided | provided | provided | provided | provided | none | provided |
| Inner sipe depth (mm) | — | — | 2 | 2 | 2 | 2 | 2 | 2.5 | 2 | 2 |
| Outer sipe depth (mm) | — | — | 3 | 3 | 3 | 3 | 3 | 2.5 | 3 | 3 |
| Wet performance | 100 | 100 | 110 | 105 | 105 | 105 | 105 | 105 | 104 | 105 |
| Noise performance | 100 | 105 | 110 | 107 | 110 | 110 | 110 | 110 | 107 | 107 |
| Ride comfort | 100 | 98 | 120 | 120 | 115 | 110 | 105 | 115 | 115 | 115 |
| Uneven wear resistance | 100 | 95 | 110 | 110 | 110 | 105 | 102 | 107 | 105 | 107 |
| Steering stability | 100 | 105 | 110 | 107 | 110 | 107 | 105 | 107 | 107 | 107 |

*1 The angle continuously changed from the inner end to the outer end. The angle at the inner end and the angle at the outer end are shown.

What is claimed is:

1. A pneumatic tire comprising:

a tread portion provided on each side of the tire equator with two axially inner circumferential grooves, two axially outer circumferential grooves and a plurality of oblique grooves, each of the axially inner and outer circumferential grooves extending substantially straight in the tire circumferential direction to define at least one substantially straight circumferential rib between the inner two circumferential grooves, and the 3. The pneumatic tire according to claim 2, wherein the axially innermost block piece has the narrowest top surface area.

4. The pneumatic tire according to claim 2, wherein said at least two sipes include an axially innermost sipe and an axially outermost sipe, and the depths of the sipes are gradually increased from the axially innermost sipe to the axially outermost sipe.

5. The pneumatic tire according to claim 1, wherein
the axially innermost block piece has the narrowest top surface area.

6. The pneumatic tire according to claim 5, wherein
said at least two sipes include an axially innermost sipe and an axially outermost sipe, and
the depths of the sipes are gradually increased from the axially innermost sipe to the axially outermost sipe.

7. The pneumatic tire according to claim 1, wherein
said at least two sipes include an axially innermost sipe and an axially outermost sipe, and
the depths of the sipes are gradually increased from the axially innermost sipe to the axially outermost sipe.

8. The pneumatic tire according to claim 1, wherein
a central circumferential groove is disposed on the tire equator and said at least one substantially straight circumferential rib is two ribs divided by a central circumferential groove.

9. The pneumatic tire according to claim 1, wherein
each said long and narrow block is substantially a parallelogram.

10. The pneumatic tire according to claim 1, wherein
said oblique grooves and sipes form a bi-directional tread pattern.

11. The pneumatic tire according to claim 1, wherein
said oblique grooves and sipes form a uni-directional tread pattern.

12. The pneumatic tire according to claim 1, wherein
said at least two sipes are inclined at angles of not more than 60 degrees with respect to the circumferential direction of the tire.

13. The pneumatic tire according to claim 1, wherein
said at least two sipes are inclined at angles of not less than 30 degrees but not more than 45 degrees with respect to the circumferential direction of the tire.

* * * * *

UNITED STATES PATENT AND TRADEMARK OFFICE
CERTIFICATE OF CORRECTION

PATENT NO.    : 6,626,215 B2
DATED         : September 30, 2003
INVENTOR(S)   : Akio Ikeda It is certified that error appears in the above-identified patent and that said Letters Patent is hereby corrected as shown below:

<u>Title page,</u>
Item [30], Foreign Application Priority Data, should read as follows:
-- Jan. 24, 2000   (JP) …………………………………….. 2000-14702 --.

Signed and Sealed this

Thirteenth Day of April, 2004

JON W. DUDAS
*Acting Director of the United States Patent and Trademark Office*